Figure 2:
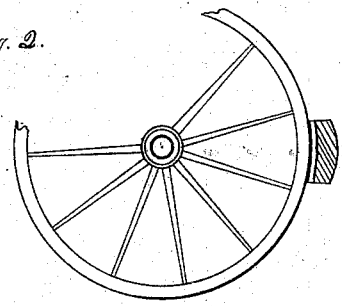

(No Model.)

W. M. GRAZE.
Plastic Composition from Paper Pulp for Floors, Brake Shoes, Journals, &c.

No. 239,951.                              Patented April 12, 1881.

WITNESSES:
A. W. Bright
A. L. Lawrence.

INVENTOR:
Wm. M. Graze.
By Leggett & Leggett,
ATTORNEY.

United States Patent Office.

WILLIAM M. GRAZE, OF LOGANSPORT, INDIANA, ASSIGNOR TO HIMSELF AND NEWTON W. TAYLOR, OF CLEVELAND, OHIO, ONE-HALF TO EACH.

PLASTIC COMPOSITION FROM PAPER-PULP FOR FLOORS, BRAKE-SHOES, JOURNALS, &c.

SPECIFICATION forming part of Letters Patent No. 239,951, dated April 12, 1881.

Application filed September 14, 1880. (No model.)

*To all whom it may concern:*

Be it known that I, WILLIAM M. GRAZE, of Logansport, in the county of Cass and State of Indiana, have invented certain new and useful Improvements in Plastic Compositions from Paper-Pulp for Floors, Brake-Shoes, Journals, &c.; and I do hereby declare the following to be a full, clear, and exact description of the invention, such as will enable others skilled in the art to which it pertains to make and use it, reference being had to the accompanying drawings, which form part of this specification.

My invention relates to a new compound or composition of matter; and it consists, broadly, in a mass composed of a mixture in suitable proportions of paper-pulp and metallic filings, said mass being brought to any desired consistency or solidity by pressure.

The uses to which my product can be put are manifold on account of its exceeding toughness and durability, its resistance to decay and climatic influence, its heat and sound non-conducting qualities, and its quality of very slight expansion and contraction from heat and cold. On account of its elasticity it will be found useful in all places where the wear of friction is to be resisted—such as journals, brake-shoes, shuttle-carriers, &c. It is also well adapted for use in the construction of floors, and a floor made or covered with my product can be as ornamental as taste may dictate, while at the same time it is always warm and a non-conductor of sound.

To make my product paper-pulp of any description is mixed with metallic filings in any suitable proportion, the relative proportions of the paper-pulp and metallic filings being governed by the particular use to which the product is designed. The pulp and metallic filings may be mixed together in any suitable way, and when mixed the mass is molded or pressed into any desired form—such as sheets or plates, journal-boxes, floor-tilings, or into any other form desired. If used for floor-tilings, any coloring pigment or dye may be added for the sake of beauty.

If the product is to be exposed to moisture or climatic influence, there may be added any protecting or antiseptic ingredient—such as paraffine, resin, or oil.

I do not limit myself in any degree to the use to which my invention can be put, and my invention not only comprehends the product herein described, but anything constructed from said product.

The toughness or hardness of said product depends upon the pressure to which it is subjected, and this may be suitably proportioned for any particular use to which the finished product is designed.

It is evident that in some cases my product would enter as an ingredient of other compositions of matter, and for certain purposes additional substances can be added for particular uses to which the finished product is to be put.

My product, as already intimated, may be made from a mixture of metallic filings and paper-pulp, with or without a sizing of oil, resin, paraffine, or equivalent substance.

I have specified metallic filings as one of the ingredients of my mass. Instead of metallic filings, pulverized ore might in some cases be substituted therefor.

Figure 3:
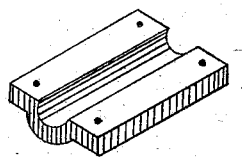
Figure 1:
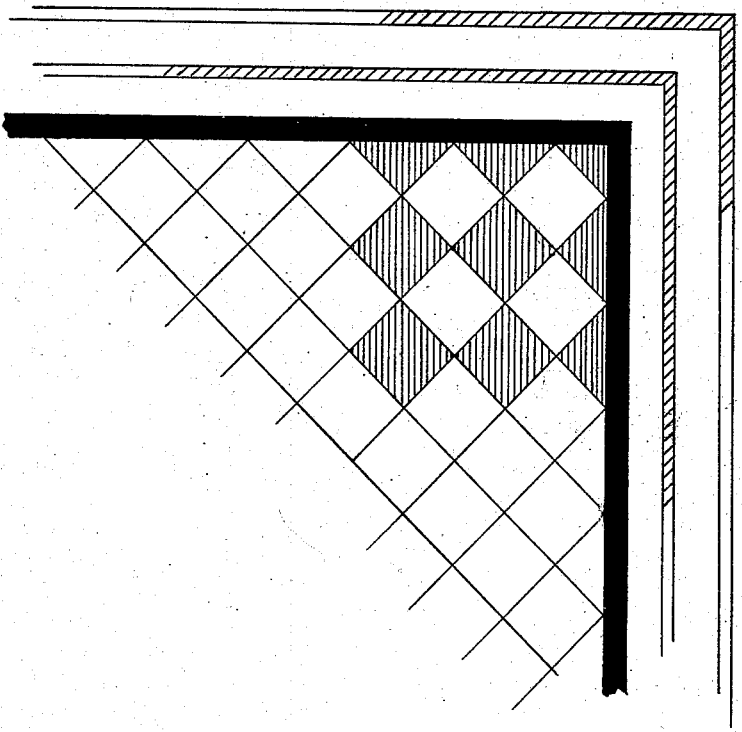

In the drawings, Figure 1 represents in plan view a floor; Fig. 2, a wheel-brake shoe; and Fig. 3, a portion of a journal-box, all of which may be formed from my composition herein specified.

What I claim is—

1. A composition of matter consisting of a mixture of paper-pulp and metallic filings, (with or without a sizing of oil, resin, paraffine, or the like,) substantially as specified.

2. As a new article of manufacture, the product obtained by mixing paper-pulp and metallic filings together (with or without a sizing of oil, resin, paraffine, or the like) and subjecting the same to pressure, substantially as specified.

3. As an article of manufacture, floor-tiling, journal-boxes, shuttle-carriers, or any other thing constructed from a mass consisting of a mixture of paper-pulp and metallic filings (with or without a sizing of oil, resin, paraffine, or the like) solidified under pressure, substantially as specified.

In testimony whereof I have signed my name to this specification in the presence of two subscribing witnesses.

WILLIAM M. GRAZE.

Witnesses:
L. L. LEGGETT,
ALBERT E. LYNCH.